US005517381A

United States Patent [19]

Guim et al.

[11] Patent Number: 5,517,381

[45] Date of Patent: May 14, 1996

[54] CIRCUIT BREAKER COUNTER INDICATOR

[76] Inventors: Raul Guim; Elena Guim, both of 834 Venetia, Coral Gables, Fla. 33134

[21] Appl. No.: 344,062

[22] Filed: Nov. 23, 1994

[51] Int. Cl.[6] ........ H02H 3/00

[52] U.S. Cl. ........ 361/102; 361/114

[58] Field of Search ........ 361/87, 93, 102, 361/114, 115; 340/635, 638, 644, 652; 324/178, 424

[56] References Cited

U.S. PATENT DOCUMENTS

| | | | |
|---|---|---|---|
| 4,056,816 | 11/1977 | Guim | 340/638 |
| 4,611,201 | 9/1986 | Guim | 340/638 |
| 4,633,240 | 12/1986 | Guim | 340/638 |
| 4,969,063 | 11/1990 | Scott et al. | 361/93 |
| 4,977,513 | 12/1990 | Lapalme | 324/424 |
| 5,051,731 | 9/1991 | Guim | 340/638 |
| 5,179,290 | 1/1993 | Page | 340/644 |
| 5,220,479 | 6/1993 | Fraisse | 361/97 |

*Primary Examiner*—Jeffrey A. Gaffin
*Assistant Examiner*—Ronald W. Leja
*Attorney, Agent, or Firm*—McHale & Slavin

[57] ABSTRACT

A counter indicator for circuit breakers maintaining a running count of the number of times that a circuit breaker has been tripped and providing a visual indication of a tripped condition. The counter indicator employs time delay circuitry so as to allow the circuit breaker to be switched manually for purposes of testing without registering a tripped condition. A two stage binary coded decimal counter visually displays the amount of counts that the breaker has been tripped or alternatively when a switch handle has been placed in an intermediate position. The device is powered by an independent battery source providing a continuous power supply to maintain memory and power to a visual display only upon detection of a tripped circuit.

14 Claims, 2 Drawing Sheets

CIRCUIT BREAKER COUNTER INDICATOR

FIELD OF THE INVENTION

The present invention relates to circuit breakers, and more particularly, to a counting device for determining the number of times an operating circuit breaker has been tripped.

BACKGROUND OF THE INVENTION

Circuit breakers are used for interrupting of an electrical circuit by the automatic separation of electrical contacts upon a current overload in the circuit. A conventional circuit breaker relies on a trip element which detects the excessive current and transmits the energy necessary to trip electrical contacts into a spaced apart position. The thermal trip element is sensitive to heat and is based upon an inverse time characteristic. Other types of over current elements are known as the shunted and the shorted turn. The shunted element is heated directly by only a portion of the current that passes through the breaker while the bussing carries the remainder. The shorted turn element is heated by transformer action and is used only in alternating current situations. Magnetic trip elements utilize a coil that is energized upon current increase.

Conventional current trip elements are bi-metal strips reactive to heat allowing the strip to bend. Current passing through the circuit breaker creates heat necessary to trip the element. Ambient temperatures will either add or subtract to the tripping action. Circuit breakers are normally placed in banks of side-by-side units in a distribution panel. An outwardly exposed front face and operating handle is readily accessible and visually observable. The operating handle has two extreme positions, one when the circuit breaker is in a circuit completing position and the other when in a circuit interrupting position. When an overload condition occurs, the circuit breaker is tripped indicating that the load circuit is interrupted simultaneously causing the operating handle to move to an intermediate position.

The detection of tripped circuit breakers lends itself to a problem which one of the inventors has established a well known repertoire of patents. For instance, U.S. Pat. No. 4,056,816 issued to Guim teaching a blown circuit breaker indicator utilizing an LED responsive to an overload position. U.S. Pat. Nos. 4,633,240 and 4,611,201 issued to Guim, et al., teaching a circuit breaker having a battery powered light energized through an auxiliary switch coupled to a breaker. U.S. Pat. No. 5,061,731 issued to Guim, et al., teaches yet another advancement in circuit breaker assemblies.

While Guim exhaustively disclosed devices for detection of tripped circuit breakers, what is found lacking in the art is a means for informing the operator of a latent condition of the circuit breaker, namely, life expectancy. Each time a circuit breaker is tripped due to over current, it causes a cycling which weakens the metal strip. For instance, a circuit breaker overloaded multiple times will result in numerous trip conditions all the result of excessive heating to the strip. In such a situation the circuit breaker will operate according to its designed duty by tripping, thus requiring a person to manually reset the breaker once the overload condition has been corrected. Each time a circuit breaker is tripped, the life of the breaker is shortened as the metal strip is heated and cooled resulting in strain hardening of the metal. Over a period of time this can adversely effect the operation of the circuit breaker to the point of causing premature overload detection or failure to detect an overload condition.

For example, an electrical circuit in a hospital emergency room can be quickly overloaded when a multitude of medical devices are coupled on a single circuit. If the circuit is oversized, no protection is provided to the individual equipment components. For this reason, it is typically mandated that the circuit breaker is routinely replaced so as to prevent such a condition from occurring without having to oversize. However, unless meticulous records are maintained, periodic replacement of all circuit breakers is a costly and inappropriate service procedure. Had the operator been able to account for which circuit breaker had been tripped and how many times that circuit breaker had been tripped, it would be cost effective to simply replace the particular circuit breaker.

Thus, what is needed in the art is a circuit breaker or device that will provide an operator with a numerical count of the number of times a circuit breaker has been triggered. This counting provides an operator with the ability to determine whether or not a particular circuit is continually subjected to an overload situation and a direct indication of how many times the circuit breaker has been tripped so as to determine replacement before failure.

SUMMARY OF THE INVENTION

The present invention is a universal trip indicator and counter for circuit breakers. The device detects the occurrence of only tripped conditions by incorporating a time delay circuit which will generate a pulse when the circuit breaker has been tripped for a period longer than ten seconds. A two stage binary coded decimal counter maintains a running count of the number of times a tripped circuit breaker has been detected. Optimum battery life is maintained by providing indicator display only when a circuit breaker is in a tripped condition which further provides a benefit of enunciating a tripped circuit. A flashing display can be used to draw attention to the breaker. The counter stays lit or flashes as long as the operating handle of the circuit breaker remains in the tripped "intermediate" position, thus facilitating the ease in determination of which circuit breaker is tripped as well as how many times the particular circuit breaker has been tripped. The delay eliminates counting when a circuit breaker is manually switched. The display can be made to illuminate in a green color to indicate a low amount of open switch conditions (e.g. less than twenty tripped conditions). A yellow color to indicate a high amount of open switch conditions (e.g. between twenty and thirty tripped conditions). A red color to indicate a need for immediate replacement (e.g. over forty tripped conditions).

Thus, an objective of this invention is to display the number of times a circuit breaker has been tripped.

Still another objective of the instant invention is to enunciate a tripped circuit breaker by illumination of a counter display in either a continuous or flashing mode.

Yet another objective of this invention is to provide an indicator counter that can be placed external of a circuit breaker switch by use of a magnetic interface between the circuit breaker switch and the control device or alternatively integrate the operating circuitry of the device into the confines of the circuit breaker switch.

Yet still another objective of the instant invention is to provide color coding of illumination amounts to provide a warning indicator by use of colors.

Another objective of the instant invention is to provide a computer interface signal from a circuit breaker for recording of a tripped circuit breaker and the amount of times the breaker has been tripped.

These and other objectives of the invention are accomplished by providing a circuit breaker counting mechanism which will become apparent from the following description taken in conjunction with the accompanying drawings wherein are set forth, by way of illustration and example, certain embodiments of this invention. The drawings constitute a part of the specification and include exemplary embodiments of the present invention and illustrate various objectives and features thereof.

DETAILED DESCRIPTION OF THE PREFERRED EMBODIMENT

Although the invention is described in terms of a specific embodiment, it will be readily apparent to those skilled in this art that various modifications, rearrangements and substitutions can be made without departing from the spirit of the invention. The scope of the invention is defined by the claims appended hereto.

Figure 1:
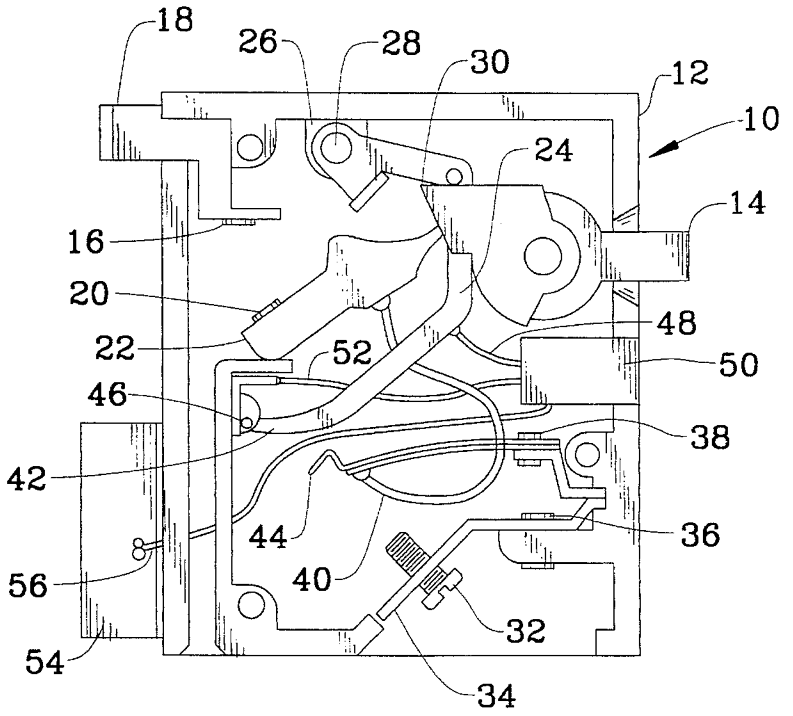
FIG. 1 is a cross-sectional side view of a conventional circuit breaker with the counter indicator of the instant invention positioned therein.

The preferred embodiment of the instant invention is for use with a conventional circuit breaker consisting of a bi-metallic overload responsive internal circuit. Referring to FIG. 1 shown is a conventional circuit breaker 10 having the indicator counter of the instant invention based upon a housing 12 constructed of a suitable insulating material and in which a side cover is omitted from the illustration to enable the interior parts to be illustrated. The circuit breaker includes a handle 14 which extends through a front wall of the housing 12 having a fixed contact 16 mounted on a terminal clip 18 which is available to engage a line bus when the circuit breaker is inserted into a conventional power distribution panel. Engaging contact 20 is mounted on a contact carrier 22. A trip arm 24 is pivoted on boss 26 by pivot pin 28 allowing contact points 16 and 20 to be engaged in a normally closed operating position or, as shown by way of illustration, placed in an over center position wherein contact point 16 and 20 are separated by an air gap with trip arm 24 separated from contact.

The handle 14, contact carrier 22 and a biasing means, not shown, forman over center arrangement or toggle which serves as an operating mechanism so as to urge the movable contacts 20 towards the fixed contact 16 when the biasing means is on one side of the pivot point 30 and urges the movable contact 20 to the open position when the biasing means is on the other side of said pivot point 30. A load terminal contacting screw 32 is available for connecting the circuit breaker to a load circuit by threading through a bus bar 34 rivetted or screwed into the case at coupling point 36.

A current responsive member known as the overload tripping mechanism is a thermally responsive or bi-metal latching member 38 which is electrically coupled to the movable contact 22 by a flexible conductor 40 such as copper wire. The thermally responsive latching member 38 is generally a hook shaped thermostat element of at least two layers of metal having dissimilar coefficients of thermal expansion so that the metal will bend as temperature increases. One end of the flexible conductor 40 is attached directly to the bi-metallic member 38 at one end and its other end is connected to contact carry 22. The other end of the bi-metallic member 38 being connected through bus bar 34 to terminal load screw 32. In a closed position, end 42 of trip arm 24 engages a hook shaped portion 44 of the bi-metallic member 38 maintaining contact 16 and 20 in a closed position. The current is then allowed to flow through bus bar 34 through the bi-metallic member 38 which is electrically coupled to the carrier arm 22 by wire 40.

A current overload operates to heat the metal causing the thermal responsive bi-metallic member 38 to soften or bend allowing the biasing means to pull the trip arm 24 over thermal member end 44 wherein the trigger arm 24 rests upon contact point 46 causing the over center movement of contact point 16 and 20 into a open position. The open position effectively creates a large air space between the contact points 16 and 20 discontinuing the flow of electricity. The circuit breaker operates in the customary manner for opening and closing of the contacts, and also for tripping under the action of an overload.

As thus far described, this circuit breaker is conventional and operates in the customary manner. This conventional construction is the same as disclosed in U.S. Pat. No. 4,056,816 and also in many other prior art patents in this art. It should be noted that the bi-metal member may be substituted for a magnetic contact without defeating the intent or scope of the instant invention.

The counter indicator 50 is electrically coupled to trip arm 24 by wire 48 which completes a circuit upon close of contact 46 by trip arm 24 so as to complete an electrical circuit switch to the counter indicator 50 by wire 52. In operation the trip arm completes the circuit necessary for the counter indicator when the normally closed contacts 16 and 20 are placed in an open or tripped condition. The open switch operates as a means for detecting the condition of the breaker and can be coupled to any mechanism within the circuit breaker so as to provide detection of a tripped circuit. This includes the use of an externally positioned magnetic switch which can be integrated into the handle 14 wherein contact is provided for the counter indicator 50 by close of the externally positioned magnetic switch condition.

Battery 54 is coupled to the counter indicator 50 by electrical connection 56 allowing an uninterrupted supply of power to memory component so as to maintain an accumulated total of the number of times the switch has been placed in an open position. The battery can be placed external of the housing 12 as depicted, allowing ease of replacement or alternatively a high quality lithium type battery may be placed within the circuit breaker providing operation for a ten year or longer period of time before replacement. It should be noted that alternative battery sources may accommodate an entire distribution panel having a plurality of circuit breakers such as a large trickle charged single battery source.

Figure 2:
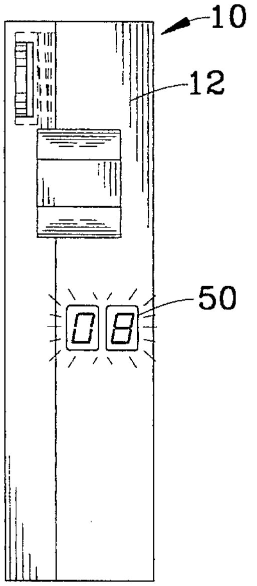
FIG. 2 is a front plane view of FIG. 1 illustrating a visual display of the counter.
Figure 3:
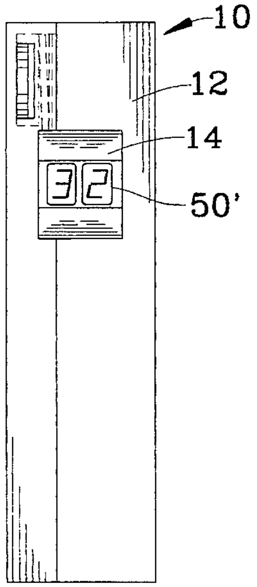
FIG. 3 is another embodiment of the instant invention illustrating the positioning of the indicator counter of the instant invention within the handle of a circuit breaker.

Referring to FIG. 2, the counter indicator 50 is shown along the front of a circuit breaker 10 allowing visual indication of the amount of open positions detected as shown in FIG. 3, the counter indicator 50 may be integrated into the handle 14 of the circuit breaker. The display may be LCD or LED and illuminated in a flashing mode so as to draw attention providing illumination of the number of counts as well as the flashing mode to draw attention. It is further advantageous to use colors for illumination wherein green may indicate zero to twenty trips indicating to the operator that the amount of trips is well within the safety factor of the particular circuit breaker. From twenty to thirty the indicator may flash in a yellow mode so as to remind the operator that the circuit breaker has been tripped a sufficient number of times so as to warrant replacement where dependability is necessary. Trip indication over thirty may flash in a red mode so as to warn the operator that the circuit breaker is no longer a reliable source of overload protection and should be immediately replaced.

Figure 4:
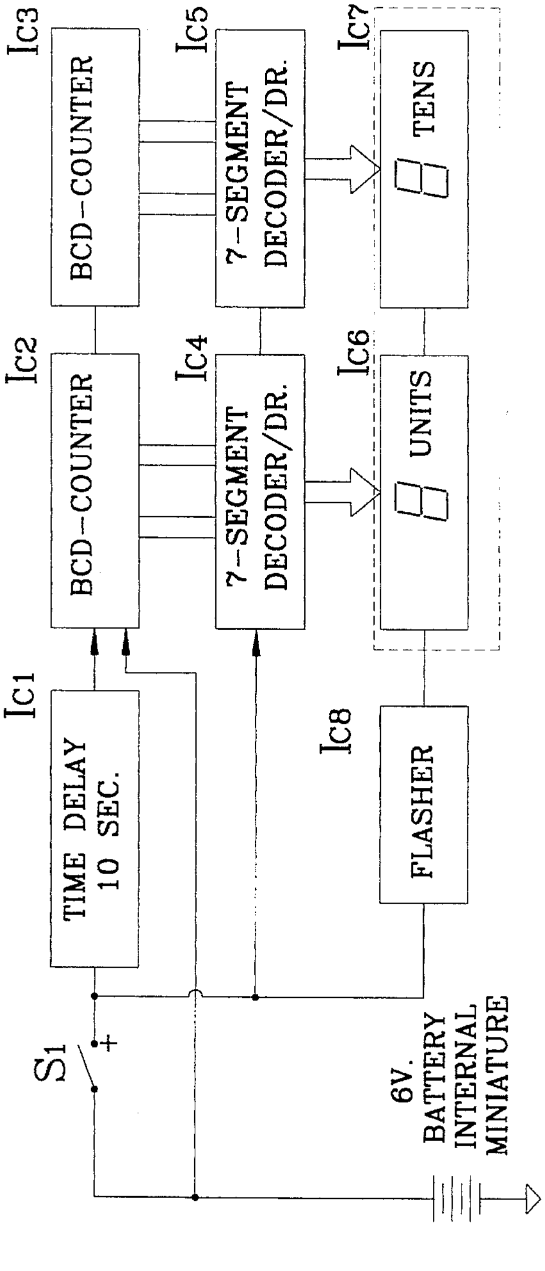
FIG. 4 is a block diagram of the electrical schematic depicting the major components.

Referring to FIG. 4 shown is a block diagram of the preferred circuitry wherein switch $S_1$ will close upon the detection of a tripped condition within the circuit breaker. As previously mentioned, this switch may be coupled internally by attachment to the trip arm or the like mechanism capable of providing an indication of an open position. The switching may also be placed externally as described earlier by use of a magnetic trip switch coupled to a handle. Switch $S_1$ is electrically coupled to a time delay relay $IC_1$ such as that manufactured by the National Semi-Conductor Corporation (NSC) having part number LM-3905-ND. The delay timer is recommended to trigger at approximately ten seconds allowing the operator to maintain an ability to check circuit breaker operation by manually closing and opening of the circuit breaker switch without affecting the circuit breaker bi-metallic strip. The time delay relay is coupled to a two stage binary coded decimal counter $IC_2$ and $IC_3$ such as NSC part number CD-4510BCN which is coupled to a seven segment latch decoder drivers $IC_4$ and $IC_5$ NSC part number CD-4511BCN which powers seven segment LED or LCD type displays $IC_6$ and $IC_7$ such as those manufactured by the Panasonic Corporation part number P324-ND.

The binary coded decimal counters $IC_2$ and $IC_3$ maintain a running count of the number of times an open switch condition has been detected. The time delay relay $IC_1$ sends a count only after the time has been exceeded to maintain a realistic count of the number of times the breaker has been overloaded. The counters $IC_2$ and $IC_3$ are energized at all times so as to maintain memory. The decoder drivers $IC_4$ and $IC_5$ are used to drive the digital display elements which will display units $IC_6$ and tens $IC_7$ allowing a running count up to ninety nine. The counter may be used to provide an interface signal from a circuit breaker for recording of a tripped circuit breaker and the amount of times the breaker has been tripped for recording by a computer.

Battery life is maintained by energizing the displays $IC_6$ and $IC_7$ only when the switch $S_1$ is in the open tripped position. A flasher circuit $IC_8$ having NSC part number LM-3909N-ND(NS) extends the life of the battery by blinking the displays which further operates to call attention to the breaker to indicate that it has been tripped. A miniature battery such as a six volt DC lithium battery Panasonic part number P-143ND can be coupled directly to the circuit providing a self-contained unit with an operational life of five to ten years depending upon the application of the breaker, the breaker environment, and the number of times the breaker has been tripped.

Figure 5:
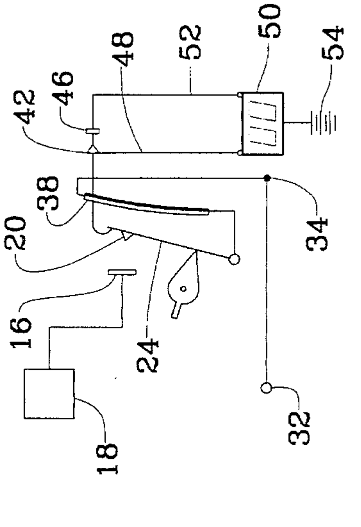
FIG. 5 is an electrical schematic with the counter indicator incorporated into a bi-metallic strip circuit breaker in an open condition.

Now referring to FIG. 5 an electrical schematic of a conventional circuit breaker incorporating the indicator counter 50 into a conventional bi-metal circuit is provided. As shown the load terminal screw 32 is coupled to the bus bar 34 which is deliverable through bi-metal strip 38 for coupling to trip arm 24. When the bi-metal strip 38 is overloaded in an open position, contacts 16 and 20 are separated discontinuing the electrical power supply that would otherwise be available through load terminal screw 32 to bus bar 18. During an open condition trip arm 24, having an end 42, contacts fixed contact 46 which is coupled to the counter 50 by wires 48 and 52. The counter 50 having an external battery power supply 54 operates to delay a count by the time delay relay approximately ten seconds so as to assure the trip was not caused manually providing an accurate depiction of the amount of counts caused by an actual overload condition.

Figure 6:
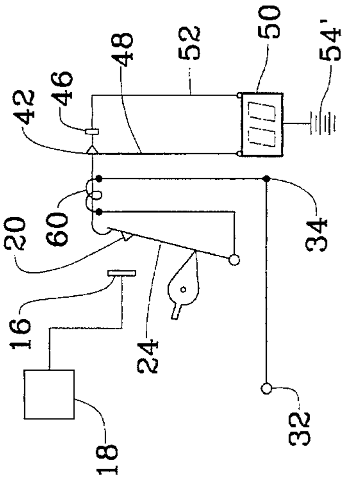
FIG. 6 is an electrical schematic with the counter indicator incorporated into a circuit breaker having a magnetic switch.

Now referring to FIG. 6 shown is a similar circuit, however based upon a magnetic overload wherein load terminal screw 32 is coupled to the magnetic overload switch 60 by bus bar 34. The magnetic switch includes a trip arm 24 having contact 20 operatively associated with the contact 16 from terminal clip 18. As noted, a similar operation occurs during an open condition wherein the trip arm end 42 is available for engaging contact 46 completing the circuit to counter 50 by electrical connection 48 and 52. The counter indicator relies upon an independent battery source 54 so as to determine the amount of times the magnetic switch has been triggered so as to help predict replacement.

It is to be understood that while we have illustrated and described certain forms of our invention, it is not to be limited to the specific forms or arrangement of parts herein described and shown. It will be readily apparent to those skilled in the art that various changes may be made without departing from the scope of the invention and the invention is not to be considered limited to what is shown in the drawings and described in the specification.

What is claimed is:

1. A circuit breaker with an integrated counter indicator, said circuit breaker of the type having a casing with a manual handle projecting outwardly from said casing for resetting electrical contacts positioned within said casing to a closed condition so as to allow the flow of electricity through said contacts wherein an overload of current through said electrical contacts results in an open switch condition which operates to interrupt the flow of electricity between said contacts automatically placing said handle in an intermediate position so as to visually indicate the open switch condition, said circuit breaker counter indicator comprising:

detecting means disposed within said cashing for detecting an open switch condition of said circuit breaker;

said detecting means includes a time delay relay providing an electrical pulse to counting means after said circuit breaker is in an open switch position for a predetermined time delay exceeding separation of said contacts;

counting means operatively associated with and responsive to said detecting means, said counting means having a memory providing an accumulated total of the number of times said circuit breaker is placed in an open switch condition;

display means visually depicting said accumulated total of said counting means;

and, means to maintain said memory of said counting means.

2. The circuit breaker counter indicator according to claim 1 wherein said display means is a digital display configured to illuminate when said breaker is in said open switch condition.

3. The circuit breaker counter indicator according to claim 2 wherein said display means includes a flasher circuit for continuously alternating said display from an off position to an illuminated position.

4. The circuit breaker counter indicator according to claim 1 wherein said display means is further defined as a decimal LCD readout.

5. The circuit breaker counter indicator according to claim 1 wherein said display means is further defined as a decimal LED readout.

6. The circuit breaker counter indicator according to claim 1 including a magnetic switch means mounted on said handle positioned to activate said detecting means when said handle is in an open switch condition.

7. The counter circuit breaker indicator according to claim 1 wherein said means to maintain said memory is a 6 volt lithium battery.

8. The counter circuit breaker indicator according to claim 1 wherein said means to maintain said memory is a rechargeable battery sized to accommodate a plurality of circuit breaker counter indicators.

9. The counter indicator according to claim 1 wherein said display means illuminates a green color to indicate a low amount of open switch conditions, yellow to indicate a high amount of open switch conditions, and red to indicate a need for immediate replacement of said breaker.

10. The counter indicator according to claim 1 including a means for providing an output interface signal for receipt by a computer monitoring system.

11. A circuit breaker with an integrated counter indicator said circuit breaker of the type having a casing with a manual handle projecting outwardly from said casing for resetting electrical contacts positioned within said casing to a closed condition so as to allow the flow of electricity through said contacts wherein an open switch condition operates to interrupt the flow of electricity between said contacts, said circuit breaker counter indicator comprising: detecting means for detecting an open switch condition of said circuit breaker; counting means disposed within said casing operatively associated with and responsive to said detecting means, said counting means having a time delay relay providing an electrical pulse to said counting means after approximately 10 seconds when said circuit breaker is in an open switch position, said counting means also having a memory providing an accumulated total of the number of times said circuit breaker is placed in said open switch condition position; display means disposed on an outer surface of said casing visually depicting said accumulated total of said counting means; and a battery means to maintain said memory of said counting means.

12. The circuit breaker counter indicator according to claim 11 wherein said display means includes a flasher means for continuously alternating said display means from an off position to an illuminated position.

13. A circuit breaker with an integrated counter indicator, said circuit breaker of the type having a casing, with a manual handle projecting outwardly from said casing for resetting electrical contacts positioned within said casing to a closed condition so as to allow the flow of electricity through said contacts wherein an open switch condition operates to interrupt the flow of electricity between said contacts automatically placing said handle in an intermediate position said circuit breaker counter indicator comprising: detecting means for detecting when said handle is in an intermediate position; counting means disposed within said casing operatively associated with and responsive to said detecting means, said counting means having a time delay relay providing an electrical pulse to said counting means after approximately 10 seconds when said handle is in an intermediate position, said counting means also having a memory providing an accumulated total of the number of times said handle is placed in said intermediate position; display means visually depicting said accumulated total of said counting means; and a means to maintain said memory of said counting means.

14. The circuit breaker counter indicator according to claim 13 wherein said display means includes a flasher means for continuously alternating said display means from an off position to an illuminated position.

* * * * *